Figure 1:
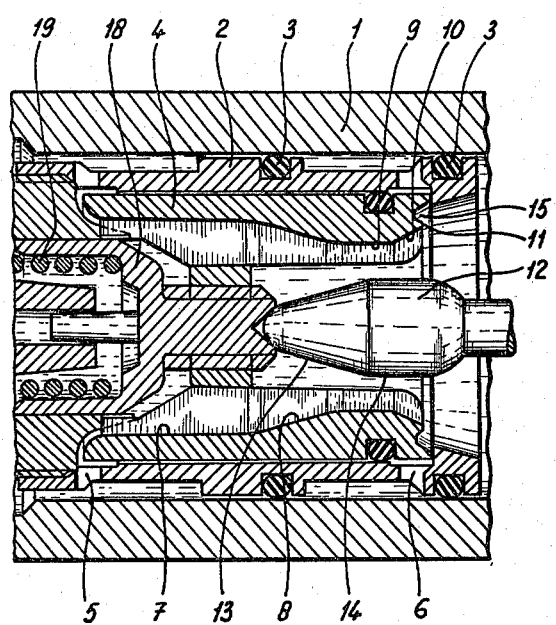

United States Patent [19]

Holthuisen

[11] 4,422,769

[45] Dec. 27, 1983

[54] MIXING APPARATUS FOR TWO FLOWING LIQUIDS

[75] Inventor: Arnoldus G. Holthuisen, Venlo, Netherlands

[73] Assignee: Metaalwarenfabriek Venlo B.V., Venlo, Netherlands

[21] Appl. No.: 358,188

[22] Filed: Mar. 15, 1982

[30] Foreign Application Priority Data

Mar. 16, 1981 [NL] Netherlands ................ 8101268

[51] Int. Cl.³ .................................... B01F 15/02
[52] U.S. Cl. .................................... 366/178; 239/416; 239/424; 137/811; 236/103
[58] Field of Search ............... 366/150, 154, 177, 178, 366/336, 337, 338, 339, 341, 342; 137/896, 898, 625.4, 808, 809, 810, 811; 239/414, 416, 417, 424, 434; 422/133; 251/339

[56] References Cited

U.S. PATENT DOCUMENTS

| | | | |
|---|---|---|---|
| 3,012,400 | 12/1961 | Corson | 239/424 |
| 3,181,546 | 5/1965 | Boothe | 137/811 |
| 3,215,352 | 11/1965 | Meraz | 239/414 |
| 3,230,972 | 1/1966 | Davis | 137/896 |
| 3,232,049 | 2/1966 | Rhodes | 239/416 |
| 3,559,885 | 2/1971 | Boekelman | 236/103 |
| 4,168,018 | 9/1979 | Zahaykevich | 366/339 |

FOREIGN PATENT DOCUMENTS 2260845 6/1974 Fed. Rep. of Germany .

*Primary Examiner*—James E. Bryant, III
*Assistant Examiner*—John Kwon

[57] ABSTRACT

Mixing apparatus for two liquids such as cold and hot water having separate annular inlets (5, 6), spaced apart, for both of the liquids and provided with an external (7, 8, 9, 10) and internal (13, 14) guides for directing one liquid to the inlet (6) of the other liquid and the discharge of the mixed liquid. Both the external (7, 8, 9, 10) and the internal (13, 14) guides of the one liquid are mainly cylindrical in front of the inlet (6) of the other liquid. At the annular inlet (6) of the other liquid an annular vortex chamber (15) is provided.

6 Claims, 2 Drawing Figures

MIXING APPARATUS FOR TWO FLOWING LIQUIDS

The invention relates to a mixing apparatus for two flowing liquids, such as cold and hot water having separate, spaced apart annular inlets for both of the liquids and an external and an internal guide for the one liquid in the direction of the inlet of the other liquid and the discharge of the mixed liquid.

Such a mixing apparatus is known as thermostatic mixing tap from U.S. Pat. No. 3,559,885.

However, the invention is not limited to a thermostatic mixing tap, but indeed, is mainly intended for a mixing tap for cold and hot water, whether thermostatically controlled or not.

In mixing two flowing liquids, such as cold and hot water, both of the liquids meet each other at a certain location in the apparatus for the purpose of being mixed. Such mixing is not always satisfactory. Often, the liquids advance as separate layers to the discharge.

In the mixing apparatus according to U.S. Pat. No. 3,559,885 the hot water flows in the direction of the cold water inlet and in flowing, is guided at the inside by an internal guide deflecting the cylindrical flow of the hot water to the outside in the direction of the cold water inlet. However, also in this case the mixing is not satisfactory.

The invention has as its object to provide a mixing apparatus in which a very intensive mixing operation occurs.

According to the invention, this is achieved because each of the internal and external guides of the one liquid is of substantially cylindrical shape in front of the inlet of the other liquid and at the annular inlet of the other liquid a annular vortex chamber is provided.

The one liquid comes to the inlet of the other liquid in a cylindrical path. Due to the presence of the vortex chamber a very intensive mixing effect occurs.

According to a preferred embodiment the external guide is in the shape of a sleeve body a portion of which is cylindrical, in which the vortex chamber is constituted in the end face of the sleeve body positioned at the inlet of the other liquid.

Preferably, the vortex chamber is further in the shape of an annular trough having its bottom facing the inlet of the one liquid.

Figure 2:
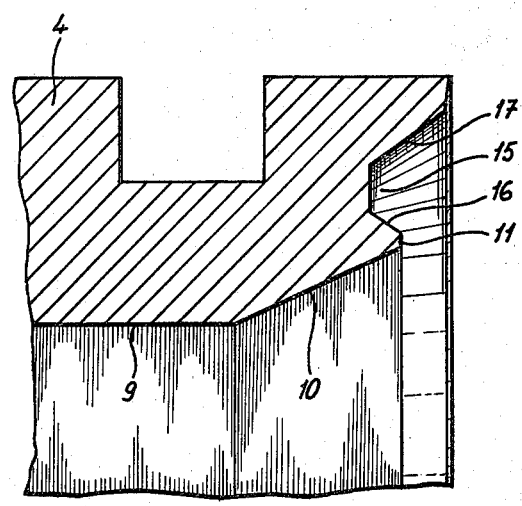

The invention will be explained now for an embodiment with reference to the drawing in which:

FIG. 1 is a longitudinal cross-section of a portion of the mixing apparatus according to the invention; and FIG. 2 is an enlarged detail cross-section of the sleeve body with the vortex chamber of the apparatus of FIG. 1.

Within a housing 1 a slide bearer 2 is arranged sealed by means of O-rings 3.

Within the slide bearer 2 a slide 4 is provided representing at the same time the sleeve-shaped external guide. Said slide 4 need not be displaceable. In a mixing apparatus having a fixed mixing ratio the slide 4 may be arranged fixed. When the temperature of the mixed liquid should be adjustable, in known way, the slide is thermostatically displaceable or not.

The ends of the slide 4 control the feeding of the one or the other liquid.

The continuous annular inlet for the one liquid, in this case the hot water, is 5 and that for the other liquid, in this case the cold water, is 6.

In the position of the slide 4 shown in FIG. 1 the inlet 6 is completely closed. Normally, the slide 4 will be in an intermediate position whether fixed or not, in which both of the inlets 5 and 6 are opened.

The inlet surface of the slide 4 represents the external guide for the liquid flowing in at 5.

Said internal surface extends first cylindrically along a portion 7, then along a portion 8 at an angle of 13°–17° to a cylindrical portion 9 having a smaller diameter than the cylindrical portion 7, subsequently along a portion 10 having a diameter progressively increasing up to a sharp outlet end 11.

The internal guide is constituted by a centrally arranged body 12 having a conical portion 13 increasing in diameter at an angle 22°–26° and a cylindrical portion 14.

The one liquid, in this case the hot water flows between the cylindrical guides 4 and 14 before reaching the inlet 6 for the cold water.

In the right hand end face of the sleeve member 4 (the slide) the trough-shaped vortex chamber is provided, indicated by 15 in FIG. 2 more clearly.

Both of the walls 16 and 17 of the trough 15 form with the axis of the trough 15 an angle of between 30° and 40°, preferably 35°. The largest width of the trough lies between 1.5 and 3 mm, preferably 2 mm. The depth of the trough amounts to between 0.5 and 2 mm.

The wall 16 is in close relation adjacent to the sharp outlet end 11.

In a specific embodiment the sharp outlet end 11 lies at a diameter of 16 mm, the beginning of the wall 16 at a diameter of 17 mm, the beginning of the wall 17 at a diameter of 21 mm. The largest width of the trough 15 amounts then to 2 mm and the depth 1.4 mm.

Because of vortex chamber 15 a very intensive mixing of both liquids takes place.

In FIG. 1, with 18 an adjusting member is indicated loaded by a compression spring 19. These parts are not relevant for the invention.

I claim:

1. A mixing apparatus for two flowing liquids, said apparatus having a first annular inlet for a first liquid and a separate, spaced apart second annular inlet for a second liquid, and also having an outlet for the two liquids after mixing, an external and internal guide for the first liquid in the direction towards the second inlet and the outlet, each of said internal and external guides having an essentially cylindrical portion immediately in front of said second inlet, said external guide being a sleeve body with an essentially cylindrical end portion and having an end face located at said second inlet, and an annular vortex chamber at said second annular inlet in said end face.

2. A mixing apparatus according to claim 1, said vortex chamber being an annular trough having a bottom directed towards said first inlet.

3. A mixing apparatus according to claim 2, said trough having walls defining outer and inner sides of the trough, said walls defining with a central axis of the trough an angle of between 30 and 40 degrees.

4. A mixing apparatus according to claim 3, wherein said angle is preferably 35 degrees.

5. A mixing apparatus according to claim 2, wherein the width of the trough in said end face amounts to between 1.5 and 3 mm.

6. A mixing apparatus according to claim 5, wherein said width is preferably 2 mm.

* * * * *